US008091757B1

(12) United States Patent  (10) Patent No.: US 8,091,757 B1
Stawarski  (45) Date of Patent: Jan. 10, 2012

(54) WIRE ALIGNMENT TOOL FOR USE DURING SOLDERING

(76) Inventor: Rafal Stawarski, Roselle, IL (US)

( * ) Notice: Subject to any disclaimer, the term of this patent is extended or adjusted under 35 U.S.C. 154(b) by 0 days.

(21) Appl. No.: 13/176,267

(22) Filed: Jul. 5, 2011

(51) Int. Cl.
   *B23K 37/04* (2006.01)
(52) U.S. Cl. .......... 228/4.5; 228/41; 228/44.3; 228/49.1
(58) Field of Classification Search .................. None
   See application file for complete search history.

(56) References Cited

U.S. PATENT DOCUMENTS

| 776,555 | A |   | 12/1904 | Settle |   |
|---|---|---|---|---|---|
| 1,286,242 | A |   | 12/1918 | Cullin |   |
| 1,980,890 | A | * | 11/1934 | Tompkins | 428/385 |
| 2,058,634 | A |   | 10/1936 | Rusk |   |
| 2,226,194 | A | * | 12/1940 | Berolsky | 228/51 |
| 2,432,428 | A |   | 12/1947 | Lang |   |
| 2,604,064 | A | * | 7/1952 | Sefton | 226/128 |
| 2,688,267 | A |   | 9/1954 | Schmuldt |   |
| 2,737,917 | A | * | 3/1956 | Steele | 81/303 |
| 2,748,245 | A | * | 5/1956 | Pearce et al. | 219/230 |
| 2,751,485 | A | * | 6/1956 | Sauer | 228/53 |
| 2,758,192 | A | * | 8/1956 | Gustafsson | 228/53 |
| 2,856,893 | A | * | 10/1958 | Harris | 118/29 |
| 2,866,069 | A | * | 12/1958 | Kriwaczek | 228/18 |
| 2,952,763 | A |   | 9/1960 | Gustafsson |   |
| 2,957,101 | A | * | 10/1960 | Barkley | 314/129 |
| 2,995,051 | A |   | 8/1961 | Redway |   |
| 3,031,562 | A | * | 4/1962 | Hongo | 228/53 |
| 3,113,541 | A |   | 12/1963 | Terry |   |
| 3,149,015 | A |   | 9/1964 | Lindsay |   |
| 3,204,647 | A |   | 9/1965 | Dekel |   |
| 3,250,453 | A |   | 5/1966 | Halstead |   |
| 3,252,645 | A |   | 5/1966 | Zoltai |   |
| 3,257,519 | A | * | 6/1966 | Kastel | 200/61.58 R |
| 3,354,478 | A | * | 11/1967 | Allen | 7/107 |
| 3,377,012 | A | * | 4/1968 | Cushman | 228/40 |
| 3,531,038 | A |   | 9/1970 | Dezzani |   |
| 3,637,129 | A | * | 1/1972 | Kaufman | 228/20.5 |
| 3,796,856 | A |   | 3/1974 | Wei-Cheng |   |
| 3,824,371 | A |   | 7/1974 | Schurman |   |
| 3,845,538 | A |   | 11/1974 | Demler |   |
| 3,852,565 | A |   | 12/1974 | Kager |   |
| 3,863,307 | A |   | 2/1975 | Leonardo |   |
| 3,896,982 | A | * | 7/1975 | Redman | 226/128 |
| 3,966,109 | A | * | 6/1976 | Hogan | 228/52 |
| 4,176,778 | A |   | 12/1979 | Fortune |   |
| 4,205,221 | A |   | 5/1980 | Meyer |   |
| 4,330,075 | A |   | 5/1982 | Rosen |   |
| 4,415,116 | A |   | 11/1983 | Norton |   |
| 4,507,545 | A |   | 3/1985 | Riordan |   |
| 4,521,673 | A | * | 6/1985 | Oury | 219/230 |
| 4,746,050 | A | * | 5/1988 | Brown | 228/57 |
| 4,932,581 | A | * | 6/1990 | Ohle et al. | 228/102 |
| 4,936,501 | A | * | 6/1990 | Babarin | 228/53 |
| 4,938,214 | A | * | 7/1990 | Specht et al. | 606/174 |

(Continued)

FOREIGN PATENT DOCUMENTS

DE          1963313 A  *  6/1971

(Continued)

*Primary Examiner* — Kiley Stoner (57) ABSTRACT

A wire alignment tool for use during soldering is disclosed. The tool includes a handle configured to contain a supply of solder, a solder advancement mechanism constructed and arranged to move the supply of solder from the handle to a soldering locus, and a clamping mechanism constructed and arranged to maintain two or more wires to be soldered at the soldering locus.

8 Claims, 7 Drawing Sheets

U.S. PATENT DOCUMENTS

| | | | |
|---|---|---|---|
| 4,967,059 A | 10/1990 | Wagner | |
| 4,991,566 A | 2/1991 | Shulman | |
| 5,155,332 A | 10/1992 | Maguire | |
| 5,159,861 A | 11/1992 | Anderson | |
| 5,325,746 A | 7/1994 | Anderson | |
| 5,379,941 A * | 1/1995 | Partel | 228/33 |
| 5,421,505 A * | 6/1995 | Hild, II | 228/41 |
| 5,423,472 A * | 6/1995 | Tsai | 228/41 |
| 5,456,684 A * | 10/1995 | Schmidt et al. | 606/41 |
| 5,482,199 A * | 1/1996 | Walker | 228/52 |
| 5,782,394 A | 7/1998 | Langley | |
| 5,839,642 A * | 11/1998 | Tait | 228/41 |
| 6,027,068 A | 2/2000 | Lantsman | 242/564.4 |
| 6,273,358 B1 * | 8/2001 | Hileman | 242/564.4 |
| 6,484,923 B2 * | 11/2002 | Figueroa-Rivera | 228/33 |
| 6,550,663 B2 * | 4/2003 | Poletaev | 228/102 |
| 6,707,007 B1 * | 3/2004 | Siddoway | 219/231 |
| 6,972,396 B2 * | 12/2005 | Miyazaki | 219/229 |
| 7,156,278 B2 | 1/2007 | Wu | |
| 7,337,534 B2 * | 3/2008 | Wong et al. | 29/739 |
| 7,774,927 B2 | 8/2010 | Karrasch | |
| 2002/0107532 A1 * | 8/2002 | Huet-Olivier et al. | 606/144 |
| 2005/0061851 A1 * | 3/2005 | Wu | 228/44.3 |
| 2005/0090839 A1 * | 4/2005 | Kraus | 606/146 |
| 2005/0209612 A1 * | 9/2005 | Nakao | 606/144 |
| 2006/0190034 A1 * | 8/2006 | Nishizawa et al. | 606/205 |
| 2006/0243851 A1 * | 11/2006 | Ishii et al. | 242/557 |
| 2008/0132919 A1 * | 6/2008 | Chui et al. | 606/145 |
| 2008/0142574 A1 | 6/2008 | Steele | |
| 2009/0007734 A1 | 1/2009 | Lulewicz | |

FOREIGN PATENT DOCUMENTS

| | | |
|---|---|---|
| JP | 58081561 | 5/1983 |

* cited by examiner

WIRE ALIGNMENT TOOL FOR USE DURING SOLDERING

FIELD OF THE INVENTION

A wire alignment tool for use during soldering is disclosed. In a preferred embodiment, the tool is constructed and arranged for use with one hand. The tool includes a grip having a cavity for storage of a supply of solder. A body attached to one end of the handle contains a guide for advancing the solder and a thumb wheel that engages the solder and advances it. At least one clamping assembly holds in position the elements to be soldered. The tool thus allows an operator to hold the elements to be soldered in a secure position and advance the solder into position utilizing only one hand, thereby leaving the other hand free to operate the soldering iron.

In a more preferred embodiment, the tool is operable with one hand for use in soldering two elements, such as wires, together. The tool is provided with an elongated handle having a compartment for storing a supply of solder. The tool can be provided with a body attached to the handle and a thumb wheel for advancement of the solder from the handle through an opening in the body towards the pieces to be soldered. The tool is provided with a pair of substantially parallel arms extending from the body and having clamping assemblies approximate their ends for securing the elements to be soldered adjacent to each other.

BACKGROUND OF THE INVENTION

There is need for a wire alignment tool for use during soldering that can provide a combination of features facilitating convenient working during soldering. The following patents and published applications illustrate the efforts of others to address the problems identified and solved by the disclosure herein. As can be seen, there are a vast array of efforts already existing to provide a solution to the problems confronted when constructed various wire alignment tools for use during soldering, but none provides the combination of features and advantages presented in the instant disclosure.

These references include: U.S. Pat. No. 7,774,927 entitled "Wire Positioning Device for a Wire Termination Machine," issued to Karrasch et al. on Aug. 17, 2010; U.S. Pat. No. 7,156,278 entitled "Auxiliary Soldering Tool," issued to Wu on Jan. 2, 2007; U.S. Pat. No. 5,782,394 entitled "Manual Welding Wire Feeder," issued to Langley on Jul. 21, 1998; U.S. Pat. No. 5,325,746 entitled "Wire Guide Control Handle," issued to Anderson on Jul. 5, 1994; U.S. Pat. No. 5,159,861 entitled "Wire Guide Control Handle," issued to Anderson on Nov. 3, 1992; U.S. Pat. No. 5,155,332 entitled "Manual Welding Wire Feeder," issued to Maguire on Oct. 13, 1992; U.S. Pat. No. 4,991,566 entitled "Articulating Mouth-Prop Device for Use in the Diagnosis and/or Treatment of Patients Suffering from Trismus or Other Medical or Dental Problems or for Other Purposes," issued to Shulman et al. on Feb. 12, 1991; U.S. Pat. No. 4,967,059 entitled "Electrical Soldering Gun with Hinged Soldering Jaws Heated by a Single Heating Element," issued to Wagner on Oct. 30, 1990; U.S. Pat. No. 4,507,545 entitled "Soldering Iron with Solder Dispensing Device," issued to Riordan on Mar. 26, 1985; U.S. Pat. No. 4,415,116 entitled "Soldering Tool with Resilient Hold-Down Attachment and Method of Using Same," issued to Norton on Nov. 15, 1983; U.S. Pat. No. 4,330,075 entitled "Soldering Tool with Feeder Mechanism," issued to Rosen on May 18, 1982; U.S. Pat. No. 4,205,221 entitled "Electrically Heated Soldering Tool Having Working Gripping Jaws," issued to Meyer on May 27, 1980; U.S. Pat. No. 4,176,778 entitled "Soldering Tool Holder," issued to Fortune on Dec. 4, 1979; U.S. Pat. No. 3,863,307 entitled "Wire Gripping Apparatus," issued to Leonardo on Feb. 4, 1975; U.S. Pat. No. 3,852,565 entitled "Solder Feeding Soldering Gun with Temperature Control," issued to Kager on Dec. 3, 1974; U.S. Pat. No. 3,845,538 entitled "Hand Tool," issued to Demler, Sr. on Nov. 5, 1974; U.S. Pat. No. 3,824,371 entitled "Gun Type Soldering Device with Improved Solder Wire Feeding Mechanism," issued to Schurman, Jr. on Jul. 16, 1974; U.S. Pat. No. 3,796,856 entitled "Solder Feeding Electric Soldering Iron," issued to Wei-Cheng on Mar. 12, 1974; U.S. Pat. No. 3,531,038 entitled "Soldering Device," issued to Dezzani on Sep. 29, 1970; U.S. Pat. No. 3,252,645 entitled "Soldering Tool," issued to Zoltai on May 24, 1966; U.S. Pat. No. 3,250,453 entitled "Pocket Type Solder Dispenser," issued to Halstead on May 10, 1966; U.S. Pat. No. 3,204,647 entitled "Integral Hair Clip Made from a Single Sheet of Resilient Material," issued to Dekel on Sep. 7, 1965; U.S. Pat. No. 3,149,015 entitled "Heat Sealing Tool," issued to Lindsay on Sep. 15, 1964; U.S. Pat. No. 3,113,541 entitled "Clip," issued to Terry on Dec. 10, 1963; U.S. Pat. No. 2,995,051 entitled "Hand-Held Wire Stripper," issued to Redway on Aug. 8, 1961; U.S. Pat. No. 2,952,763 entitled "Soldering Tool with Solder Chamber and Feeding Device for One Hand," issued to Gustafsson on Sep. 13, 1960; U.S. Pat. No. 2,688,267 entitled "Holder for Wire Leads," issued to Schmuldt on Sep. 7, 1954; U.S. Pat. No. 2,432,428 entitled "Self-Feeding Soldering Tool," issued to Lang on Dec. 9, 1947; U.S. Pat. No. 2,058,634 entitled "Soldering Tool Attachment," issued to Rusk on Oct. 27, 1936; U.S. Pat. No. 1,286,242 entitled "Soldering Tool," issued to Cullin on Dec. 3, 1918; U.S. Pat. No. 776,555 entitled "Soldering Pliers," issued to Settle on Dec. 6, 1904; U.S. Patent Application Publication No. US 2009/0007734 A1 entitled "Fuel Injector Connector Installation Tool," in the name of Lulewicz et al., published on Jan. 8, 2009; U.S. Patent Application Publication No. US 2008/0142574 A1 entitled "Alignment Tool for Use in Soldering Roughed-In Service Pipes," in the name of Steele, published on Jun. 19, 2008; and Japanese Patent No. JP 58081561 entitled "Jig for Aligning and Supporting of Object to be Soldered," in the name of Masuda Tsugunori et al., published on May 16, 1983. These references are discussed in greater detail as follows.

U.S. Pat. No. 7,774,927 generally discloses a wire positioning device for a termination machine includes a support housing configured to be located proximate to a termination zone of the termination machine. A wire gripping mechanism is coupled to the support housing and defines a wire alignment axis. The wire gripping mechanism is configured to hold a wire along the wire alignment axis. The wire gripping mechanism and wire are movable with respect to the support housing along a linear transfer path that is oriented transverse to the wire alignment axis. An electric actuator is mounted to the support housing and is joined to the wire gripping mechanism. The actuator drives the wire gripping mechanism along the transfer path.

U.S. Pat. No. 7,156,278 generally discloses an auxiliary soldering tool includes a first jaw plate having a first holding portion and a first holding portion, a second jaw plate having a second holding portion and a second holding portion, and two elastic press plates each respectively rested on the first holding portion of the first jaw plate and the second holding portion of the second jaw plate. Thus, the auxiliary soldering tool facilitates the soldering work of two wires, so that the worker can solder and connect the two wires easily and conveniently. In more detail, the reference discloses an auxiliary soldering tool including a first jaw plate 10 with first holding portions, substantially V-shaped support portions (16, 26), a second jaw plate 20 with second holding portions, two handles 30, two elastic press plates 50 with press portions 56, and a torsion spring 19 wherein the auxiliary soldering tool facilitates the soldering work of two wires so that a worker can solder and connect the two wires easily and conveniently (FIGS. 12 and 2; Column 2, Lines 10-68; claims 1, 10, and 14).

U.S. Pat. No. 5,782,394 generally discloses a manual welding wire feed apparatus having a holder (2) shaped to fit the hand as would a pencil. A finger wheel (16) with two O-rings (18) operates by the tip of the index finger. The finger wheel rolls against an idler wheel (4) biased together by an outer elastic band (32).

U.S. Pat. No. 5,325,746 generally discloses a lockable wire guide control handle for grasping and manipulating a wire guide. The control handle includes an elongated member and a thumb slide positioned in a retention channel formed in the distal portion of the elongated member. The proximal portion of the elongated member is cylindrical having an enclosed passageway extending longitudinally therethrough, which is offset for passage of the wire guide therethrough. The distal portion of the elongated member includes a dovetail-shaped retention channel, the bottom surface including an inclined slot for positioning the wire guide therein. The thumb slide includes a mating dovetail-shaped tenon positioned in the retention channel. Extending from the flat surface of the dovetail-shaped tenon is an inclined projection for fixedly positioning the wire guide in the inclined slot. The inclined slot and projection have a variable, uniform spacing therebetween for fixedly positioning various diameter wire guides therein. Described in greater detail, the reference discloses a wire guide 11 including a lockable control handle 10, an elongated member 12, a thumb slide 13, and an enclosed passageway 15 positioned in a retention channel formed in the distal portion of the elongated member (FIG. 1; Column 4, Lines 37-60; claims 1, 6, and 10).

U.S. Pat. No. 5,159,861 generally discloses a lockable wire guide control handle for grasping and manipulating a wire guide. The control handle includes an elongated member and a thumb slide positioned in a retention channel formed in the distal portion of the elongated member. The proximal portion of the elongated member is cylindrical having an enclosed passageway extending longitudinally therethrough, which is offset for passage of the wire guide therethrough. The distal portion of the elongated member includes a dovetail-shaped retention channel, the bottom surface including an inclined slot for positioning the wire guide therein. The thumb slide includes a mating dovetail-shaped tenon positioned in the retention channel. Extending from the flat surface of the dovetail-shaped tenon is an inclined projection for fixedly positioning the wire guide in the inclined slot. The inclined slot and projection have a variable, uniform spacing therebetween for fixedly positioning various diameter wire guides therein.

U.S. Pat. No. 5,155,332 generally discloses a hand held welding wire feeder that is small enough and shaped correctly to fit within a user's hand. A thumb operated feed wheel rolls against a springable idler roller with the wire guided between the two by tubes in line with the contact area between the thumb feed wheel and the idler roller. The exit tube can be telescoped to the desired length. The thumb wheel has a self centering valley and groove that adapt to any diameter wire.

U.S. Pat. No. 4,991,566 generally discloses a device for dilating and propping open a patient's jaws. The device includes a pair of outwardly-extending upper arms and a pair of outwardly extending lower arms. Each of the arms has a respective distal end which has a pad pivotally mounted thereon which contacts the patient's jaws during use thereof, and a respective proximal end which is pivotably secured to the housing. Means is provided for pivoting the distal ends of the upper arms towards and away from the distal end of the lower arms such that the distal ends move substantially arcuately between the open and closed positions. A worm and worm wheel arrangement is provided for pivoting the arms, such that the spacing therebetween is infinitely variable.

U.S. Pat. No. 4,967,059 generally discloses an electrical soldering gun for pipe soldering. The gun has a plastic case with a pistol grip handle and a single elongated electric heating element extending longitudinally of the case. A first soldering jaw with recesses is disposed on and extends axially of the heating element and has directly hingedly connected in heat exchange relationship therewith a second jaw provided with complementary recesses for cooperating with the first jaw recesses to receive and grip a pipe to be soldered. The second jaw is connected to a slidable trigger on the casing by a pull rod for manually pivotally moving the second jaw away from the first jaw against the force of a spring associated with the trigger normally biasing the push rod and second jaw toward the first jaw.

U.S. Pat. No. 4,507,545 generally discloses a device for feeding solder wire from a spool to the heated tip of a pencil-type solder iron. The device includes a rigid support strip secured by a pair of spaced bands to the front and rear ends of the elongated handle of the soldering iron. The strip extends longitudinally of the handle and is at one side of the handle. A guide provided with a wire-receiving passage therethrough is carried by the support strip. The guide includes a flexible tube which extends forwardly from the front end of the handle. The forward end of the tube is open and is located near the tip of the soldering iron. A spool of solder wire is rotatably mounted on the support strip near the rear end thereof. A first wheel is adjustably mounted on the support strip forwardly of the spool for frictionally engaging the solder wire extending through the guide to advance the solder wire forwardly through the guide when the first wheel is rotated in one direction relative to the support. A second wheel larger in diameter than the first wheel is secured to one side of the first wheel and is coaxial therewith. The second wheel is adapted to be engaged by the index finger of the hand when the handle of the soldering iron is supported between the index finger and the thumb of the hand. The wheels are adjustably mounted as a unit on the support so that the amount of frictional force exerted by the first wheel on the solder wire can be adjusted.

U.S. Pat. No. 4,415,116 generally discloses a soldering tool with a resilient hold-down attachment. Also disclosed is a method of using said tool or a plurality of such tools to solder a braided lead wire to a bus bar fused to a glass substrate. Such tools are used to make heated backlights for automobiles.

U.S. Pat. No. 4,330,075 generally discloses a soldering tool having a handle, a heating element, and a feeder mechanism for feeding wire or strip soldering metal through a passage in the handle. An attachment piece comprising a manually operated member which can be depressed towards the handle is provided, and a slide which is displaceable in one direction against spring bias by depression of the manually operated member is provided. The slide has a drive to displace the soldering metal together with the slide in said one direction and to advance the soldering metal towards the tip of the heating element through a guide tube. The tube is arranged on a bracket supported by the handle and positioned to be adjustable in relation to the heating element. A latch member is arranged to prevent backward movement of the soldering metal at the return of the slide under the spring bias in the other direction.

U.S. Pat. No. 4,205,221 generally discloses an electrically heated soldering tool for gripping and heating joints that are to be soldered together. The tool includes a pistol-grip case having a stationary upper jaw and a pivotable lower jaw extending from the front end thereof. The jaws have confronting portions shaped to closely grip the work and are each provided with an electric heating element for heating the confronting portions of the jaws. The jaws are detachably secured to the case by prong and socket connections. An air duct in each jaw communicates with air outlet openings in the confronting portion of the jaw and a motor-driven fan is provided in the case for selectively directing air through the ducts and outlet openings, whereby, dependent on whether or not the heating elements are energized, either heated air or cool air can be directed against the work to heat or cool the work.

U.S. Pat. No. 4,176,778 generally discloses a general purpose soldering tool holder which will fit most electrically-heated soldering instruments. The tool holder is provided with an external apertured grill to permit the circulation of air therethrough. The outer surface is maintained cool to the touch due to the provision of a heat shield spaced from the grill. The heat shield preferably consists of a material having low-heat transfer characteristics. The soldering instrument is guided by a tip alignment flap forming part of the heat shield. The instrument rests on an intermediate ledge forming part of the tool housing and on an upper rest shaped to accommodate the handle of the soldering instrument. The housing further includes trays for holding a solder spool and a desoldering braid spool which may also be mounted on a shaft. A well is provided in the housing upon which rests a non-wicking foam pd and an outer porous wicking pad for cleaning the tip of the instrument. This will reduce evaporation and subsequent cooling by the cleaning liquid. A cylindrical opening is provided for housing a flexible sleeve which is threaded and meshes with a corresponding threaded locking bolt for securing the tool holder to a working bench.

U.S. Pat. No. 3,863,307 generally discloses a temporary means for securing and holding a cable to enable a workman to maneuver for lashing and/or installing equipment into place. The apparatus is a self-contained unit with a clamp section on a screw that moves into or out of a handle as the handle is rotated, to move the clamp section with respect to an end face of the handle against which the clamp section clamps the cable.

U.S. Pat. No. 3,852,565 generally discloses a one-hand soldering gun having a two-part hollow plastic casing. A first part has an integrally formed pivot pin for supporting a toothed feed wheel, elements defining a slide path for a soldering wire, slotted holders for securing a spring to press the solder wire against the periphery of the feed wheel, and pins for detachably affixing terminals of a conductor plate. Means is provided in the casing for controlling the temperature of the soldering iron. A trigger including a pawl serves to rotate the feed wheel, feeding the soldering wire against the heated soldering iron.

U.S. Pat. No. 3,845,538 generally discloses a hand operated tool for assembling tubular connecting devices. A pair of opposing jaws, each the mirror image of the other and having laterally movable flange-engaging inserts pivotally mounted on flange-engaging rigid semi-circular base portions, is provided. The inserts move out to permit the positioning of the tubular connecting device in the bed of the base portion and upon such positioning, the inserts spring back into position to form an enclosure about the device.

U.S. Pat. No. 3,824,371 generally discloses an electrical gun-type soldering device having a solder wire feeding mechanism preferably in the form of an attachment. The feeding mechanism has an actuating member with a thumb engaging portion adapted to be selectively disposed in either one of two normally biased inoperative positions. In one of these positions, the thumb engaging portion is disposed adjacent the upper left side of the handle portion of the soldering device for convenient engagement by the right thumb of a right-handed operator. In the other of these positions, the thumb engaging portion is disposed adjacent the upper right side of the handle portion for convenient engagement by the left thumb of a left-handed operator. The actuating member is mounted by means of a flexible cable and a surrounding closely wound coil spring for movement from the selected normally biased inoperative position through successive operative cycles. Each of these cycles includes a downward working stroke by downward digital pressure of the thumb and an upward return stroke of the thumb engaging portion by release of the thumb pressure. The feeding mechanism also includes a pair of cooperating rollers mounted with their peripheries in cooperating relation to drivingly engage therebetween the intermediate portion of a solder wire extending from a supply spool and a ratchet mechanism for effecting an incremental rotational movement of at least one of the rollers in response to an operating cycle of the actuating member.

U.S. Pat. No. 3,796,856 generally discloses an electric soldering iron having a grip from which there extends a heated copper soldering tip. A roll of wound wire-solder is housed within the grip and the wire-solder is led through a guide to a point adjacent the soldering tip. The wire-solder is fed by being gripped between a pair of gears, one of which is secured to a disk and the other of which is spring biased toward the first gear. The peripheries of the two gears are formed with mating annular grooves through which the wire solder extends. The disk has a knurled periphery which projects outwardly through a side wall of the grip. Wire solder can be delivered to the pointed head of the tip of the heater through the wire-delivery pipe by rotating the periphery of the disk with a finger tip and the soldering can be conducted easily with one hand.

U.S. Pat. No. 3,531,038 generally discloses a soldering device having a support mounting a soldering iron with the tip projecting therefrom.

The support carries a pivotal guide arrangement which receives a length of solder and directs it from an outlet adjacent the tip. Jaws are in the guide arrangement for gripping the solder and advancing it through the stroke upon actuation of the device. As the solder is advanced, the guide is pivoted to bring its outlet adjacent the top of the soldering iron to be heated.

U.S. Pat. No. 3,252,645 generally discloses a soldering tool having a solder feeder attached to it. The feeder is adjustable so that solder can be fed to the soldering iron tip at a predetermined position each time the solder is brought forward.

U.S. Pat. No. 3,250,453 generally discloses a dispenser 10 for wire solder embodying a cylindrical body 11, an outlet neck 12, wire solder 14, and a finger-operated wheel 18 (FIG. 1; Column 1, Lines 56-64; Column 2, Lines 12-20; claims 1 and 8).

U.S. Pat. No. 3,204,647 generally discloses a hair clip made from a single sheet of resilient material. A pair of clip arms is positioned at a first end of the apparatus. A riser positioned at the opposite end of the apparatus from the pair of clips is depressable such that, upon depressing the riser, the jaws of the clip arms are opened to receive hair. FIGS. 1 and 2.

U.S. Pat. No. 3,149,015 generally discloses a heat fusion bonding tool constructed and arranged for heating the ends of synthetic tapes.

U.S. Pat. No. 3,113,541 generally discloses a clip constructed and arranged to absorb heat imparted to a piece to be soldered so that at least a portion of the heat will be diverted from being conducted to portions of the piece to be soldered that are not directly related to the solder joint. The clip has a pair of interconnected U-shaped bodies (10 and 12) that are spring loaded to the normally closed position including bights (13 and 14), manually operated and elongated handles (15 and 16), wire leads 22 engaged by the clip, and a substantially U-shaped flat spring 26 located between the handles (FIGS. 1 and 2; Column 2, Lines 1-28; claims 1-3).

U.S. Pat. No. 2,995,051 generally discloses a hand-held wire stripper. Generally starting with a conventional pair of needle-nosed pliers, the disclosure provides for a second pair of jaws, one each being movably mounted on the respective jaws of the pliers. These are moveable simultaneously when the pliers are operated.

U.S. Pat. No. 2,952,763 generally discloses a soldering tool having a pistol-like configuration and having a hollow handle for containing solder. A heating element and a soldering tip are provided and constructed and arranged to receive the solder at the tip. A clamp operative at the tool handle extends therefrom to clamp or release the soldering tip.

U.S. Pat. No. 2,688,267 generally discloses a holder for wire leads for use when a pair of wires is to be processed. A pair of movable arms is pivotally mounted on one end of a base member, the arms having jaws protruding beyond the end of the base. A jaw member is pivotally mounted on the other end of the base. A spacing assembly is provided by which the space between the arms is adjustable.

U.S. Pat. No. 2,432,428 generally discloses a roller-wheel assembly for feeding solder wire to a soldering iron. The wheel has a ratchet mechanism therein.

U.S. Pat. No. 2,058,634 generally discloses an attachment for soldering tools having handles at the rear ends thereof and portions extending forward therefrom. A frame is fixed on and extends from the forwardly extending portion of a soldering tool and has a bar adapted to rest thereon to facilitate a user during a soldering operation.

U.S. Pat. No. 1,286,242 generally discloses a combined soldering device and mechanism for holding a piece to be soldered and also holding the solder itself.

U.S. Pat. No. 776,555 generally discloses soldering pliers comprising spring-expanded plates, parallel jaws at the forward ends of the plates, comprising separate spring-expanded grasping pieces and a mechanism to draw the parts and the jaws toward one another.

U.S. Patent Application Publication No. US 2009/0007734 A1 generally discloses a fuel injector connector installation tool. A pair of action members is joined at a fulcrum and provided with indented grasping members.

U.S. Patent Application Publication No. US 2008/0142574 A1 generally discloses an alignment device for soldering roughed-in pipes for plumbing applications that assists plumbers by acting as a third hand for the plumber. One portion of the device removably attaches to a plumbing wall-strap while another portion of the device holds one or more pipes perpendicularly in place, in order that a plumber may solder the pipes in place without the need for assistants or additional tools.

Japanese Patent No. JP 58081561 generally discloses a jig for aligning and supporting objects to be soldered. Plural sets of a two-piece set of lower steel wires extend between frame bodies, and a two-piece set of upper steel wires are set at one end of the frame bodies and supported at the other end by freely vertically movable gate bodies in the upper part of the former steel wires.

Thus, a problem associated with devices that precede the present disclosure is that they do not provide, in combination with the other features and advantages disclosed herein, a wire alignment tool for use during soldering that is constructed and arranged to hold two wires in position to be soldered together with a pair of secure yet readily adjustable clamping mechanisms.

Yet another problem associated with devices that precede the present disclosure is that they do not provide, in combination with the other features and advantages disclosed herein, a wire alignment tool for use during soldering that is constructed and arranged to position two wires to be soldered together at a specific point of joinder.

Still a further problem associated with devices that precede the present disclosure is that they do not provide, in combination with the other features and advantages disclosed herein, a wire alignment tool for use during soldering that is constructed and arranged to feed a supply of soldering wire to the specific point of joinder.

An additional problem associated with devices that precede the present disclosure is that they do not provide, in combination with the other features and advantages disclosed herein, a wire alignment tool for use during soldering that is constructed and arranged to retain internally a supply of soldering wire sufficient to supply the needs of a multiplicity of soldering operations.

Another problem associated with devices that precede the present disclosure is that they do not provide, in combination with the other features and advantages disclosed herein, a wire alignment tool for use during soldering that is constructed and arranged to provide a gripping surface sized to fit in one hand.

An even further problem associated with devices that precede the present disclosure is that they do not provide, in combination with the other features and advantages disclosed herein, a wire alignment tool for use during soldering that is constructed and arranged to provide a feed mechanism that facilitates ready advancement of soldering wire to the specific point of joinder that is operable by movement of only the thumb of the hand that is holding the tool.

There is a demand, therefore, to overcome the foregoing problems while at the same time providing a wire alignment tool for use during soldering that is relatively low in cost to manufacture and yet possesses extended durability.

SUMMARY OF THE INVENTION

In a preferred embodiment, the tool is constructed and arranged for use with one hand. The tool includes a grip having a cavity for storage of a supply of solder. A body attached to one end of the handle contains a guide for advancing the solder and a thumb wheel that engages the solder and advances it. At least one clamping assembly holds in position the elements to be soldered. The tool thus allows an operator to hold the elements to be soldered in a secure position and advance the solder into position utilizing only one hand, thereby leaving the other hand free to operate the soldering iron.

In a more preferred embodiment, the tool is operable with one hand for use in soldering two elements, such as wires, together. The tool is provided with an elongated handle having a compartment for storing a supply of solder. The tool can be provided with a body attached to the handle and a thumb wheel for advancement of the solder from the handle through an opening in the body towards the pieces to be soldered. The tool is provided with a pair of substantially parallel arms extending from the body and having clamping assemblies approximate their ends for securing the elements to be soldered adjacent to each other.

Thus, it is an object of the present disclosure to provide, in combination with the other features and advantages disclosed herein, a wire alignment tool for use during soldering that is constructed and arranged to hold two wires in position to be soldered together with a pair of secure yet readily adjustable clamping mechanisms.

Yet another object of the present disclosure is to provide, in combination with the other features and advantages disclosed herein, a wire alignment tool for use during soldering that is constructed and arranged to position two wires to be soldered together at a specific point of joinder.

Still a further object of the present disclosure is to provide, in combination with the other features and advantages disclosed herein, a wire alignment tool for use during soldering that is constructed and arranged to feed a supply of soldering wire to the specific point of joinder.

An additional object of the present disclosure is to provide, in combination with the other features and advantages disclosed herein, a wire alignment tool for use during soldering that is constructed and arranged to retain internally a supply of soldering wire sufficient to supply the needs of a multiplicity of soldering operations.

Another object of the present disclosure is to provide, in combination with the other features and advantages disclosed herein, a wire alignment tool for use during soldering that is constructed and arranged to provide a gripping surface sized to fit in one hand.

An even further object of the present disclosure is to provide, in combination with the other features and advantages disclosed herein, a wire alignment tool for use during soldering that is constructed and arranged to provide a feed mechanism that facilitates ready advancement of soldering wire to the specific point of joinder that is operable by movement of only the thumb of the hand that is holding the tool.

The following disclosure provides a wire alignment tool for use during soldering that provides the foregoing advantages while at the same time is relatively low in cost to manufacture and possesses extended durability.

BRIEF DESCRIPTION OF THE DRAWINGS

In the detailed description that follows, reference will be made to the following figures.

DETAILED DESCRIPTION OF PREFERRED EMBODIMENTS

Referring now to a detailed description of preferred embodiments, a wire alignment tool 10 for use during soldering is disclosed. The tool 10 is constructed and arranged to be held in one hand during use. The tool generally has a handle 20 mated to a tool body portion 30 providing a jaw mount base 40. At least one stationary jaw 112 is provided in fixed relation to the handle 20 and positioned to cooperate with at least one movable jaw 140 to provide at least one clamping assembly 100 constructed and arranged to hold two or more wires 60, 70 having ends 80, 90 to be soldered together in place at a soldering locus.

A solder supply assembly 200 is constructed and arranged to facilitate delivery of solder to the soldering locus. In a more preferred embodiment, the tool 10 is configured such that wires 60, 70 are aligned and the solder are deliverable to the soldering locus (i.e. the point in space at which the wire ends to be joined 80, 90 are positioned in place to be soldered) using only one hand. This way, the other hand is free to manipulate the source of heat from, e.g., a soldering iron. As heat is applied to the solder at the soldering locus, solder is provided as needed to maintain a continuous soldering function until the wires are soldered together.

Alternative embodiments are disclosed for each of the clamp assemblies 100 and solder supply assembly 200. As shown in FIGS. 1 through 7, a clamp assembly 100 provides an extension horizontal jaw assembly 110 having two pairs of cooperating jaws. Two stationary jaws 112, 114 cooperate, respectively, with two externally positioned movable jaws 140, 160 to hold the wires 60, 70 in position to be soldered. The movable jaws 140, 160 are urged toward the stationary jaws 112, 114, as explained in more detail below. A solder supply assembly 200 includes a vertically oriented thumbwheel 216 for feeding a supply of solder to the soldering locus.

In a second embodiment, as shown in FIGS. 8 through 15, a clamp assembly 300 provides an integral horizontal jaw assembly 310 having two pairs of cooperating jaws. Two stationary jaws 312, 314 cooperate, respectively, with two internally positioned movable jaws 340, 360 to hold the wires 60, 70 in position to be soldered. The movable jaws 340, 360 are urged toward the stationary jaws 312, 314, as explained in more detail below. A solder supply assembly 400 includes a horizontally oriented, off-center thumbwheel 416 for feeding a supply of solder to the soldering locus.

Figures 1, 2:
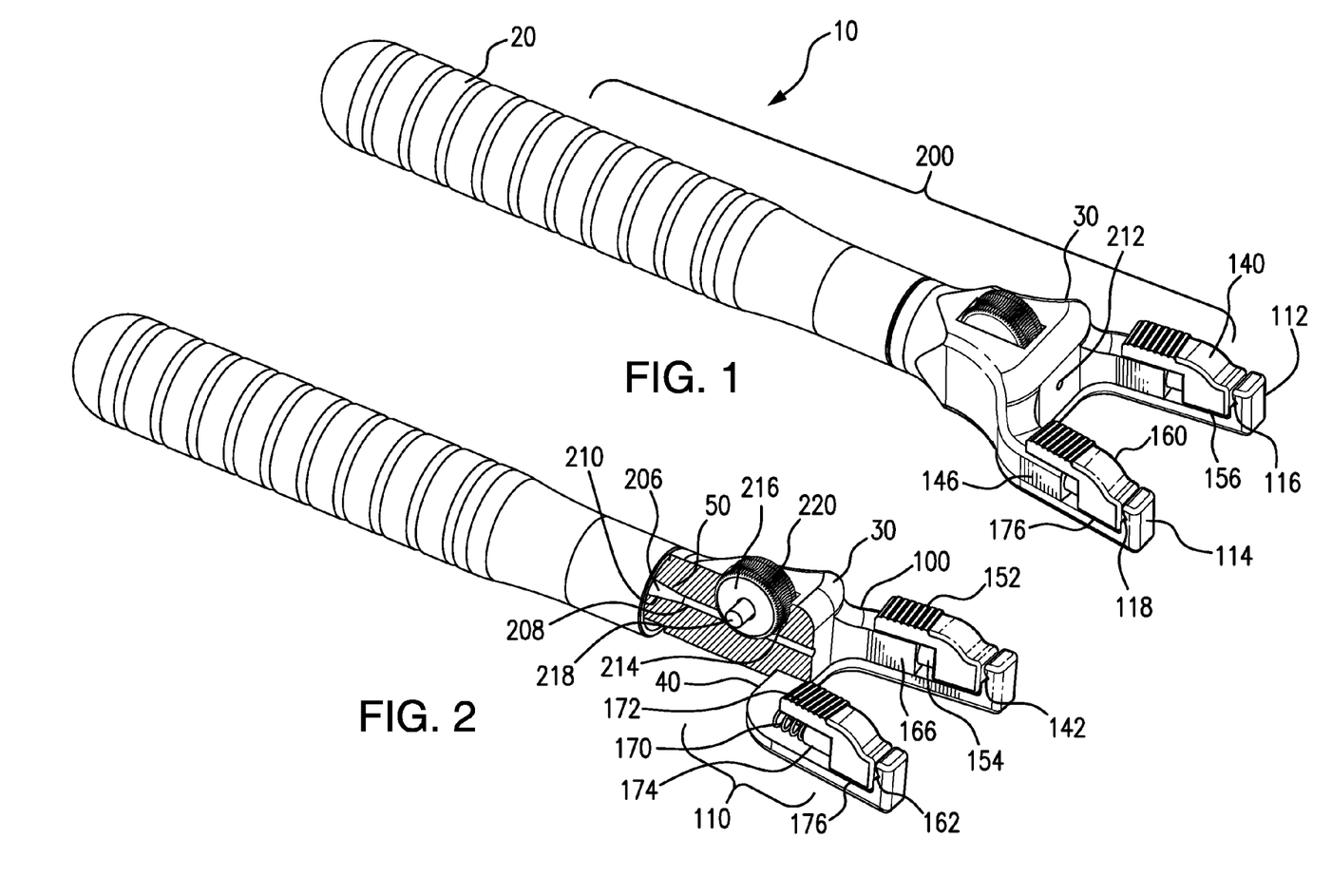
FIG. 1 is a perspective view of a first preferred embodiment.
FIG. 2 is a cut-away view of the preferred embodiment illustrated in FIG. 1.

Returning to the first embodiment of the clamp assembly 100 in more detail, shown in FIGS. 1-8, two jaw pairs are provided, although it can be seen that a single jaw pair of similar construction would suffice to maintain two wires in position to be soldered. Referring briefly to FIG. 2, a single-piece jaw mount base 40 is provided in the tool body portion 30 of the tool 10. A single jaw piece 120 extends from the jaw mount base 40 to form the stationary jaws 112, 114. Each jaw 112, 114 is provided with a substantially horizontal, perpendicularly opposed wire retaining groove 116, 118 to facilitate securement of a wire. The jaw piece 120 is removably attached to the base 40 via screws 122, 124, 126, 128 (shown in FIG. 9, but also present on this first embodiment) that are inserted into threaded apertures 132, 134, 136, 138 (shown in FIG. 15, but also present on this first embodiment). It is apparent that the base 40 and jaw piece 120 could be fabricated to be a single piece; however, in the preferred embodiment, replaceability of jaw piece 120 is desired.

Referring to FIGS. 1 and 2, two movable jaws 140, 160 are constructed and arranged to cooperate with respective stationary jaws 112, 114 to hold wires 60, 70 (Shown in FIG. 8, but also present in this first embodiment) in place for soldering. Each movable jaw 140, 160 is movable from a first, releasing position away from its corresponding stationary jaw 112, 114 and a second, contact position adjacent to or proximal to its corresponding stationary jaw 112, 114. One of these jaws is shown in cutaway view in FIG. 5. The movable jaws 140, 160 are biased toward the contact position by a biasing assembly, as follows.

Figure 5:
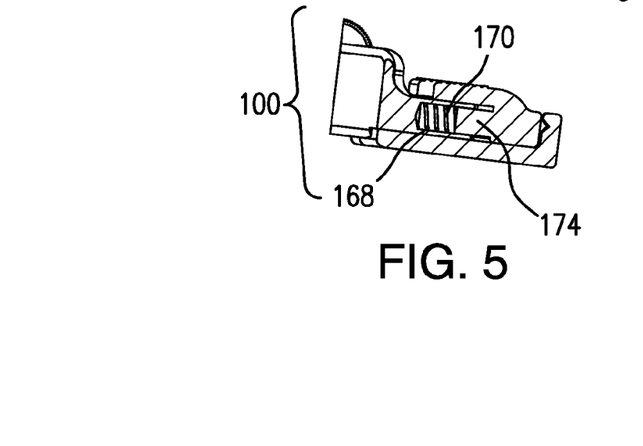
FIG. 5 is a cross-sectional view of the preferred embodiment illustrated in FIG. 4 taken along the line 5-5.
Figure 6:
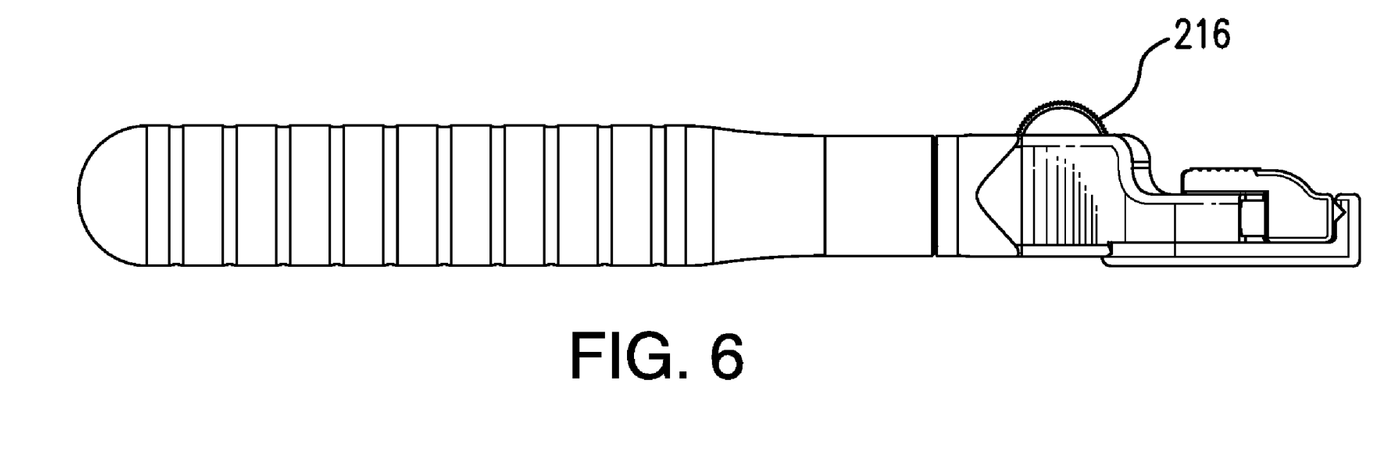
FIG. 6 is a side view of the preferred embodiment illustrated in FIG. 1.
Figure 7:
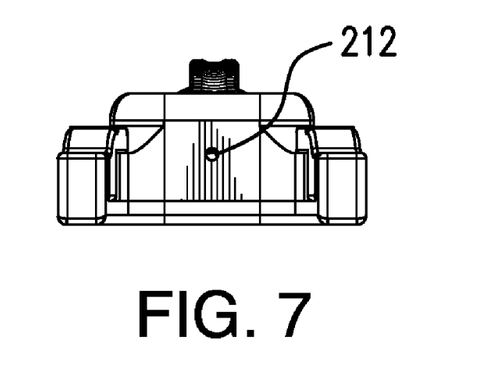
FIG. 7 is a front view of the preferred embodiment illustrated in FIG. 1.
Figures 8, 9:
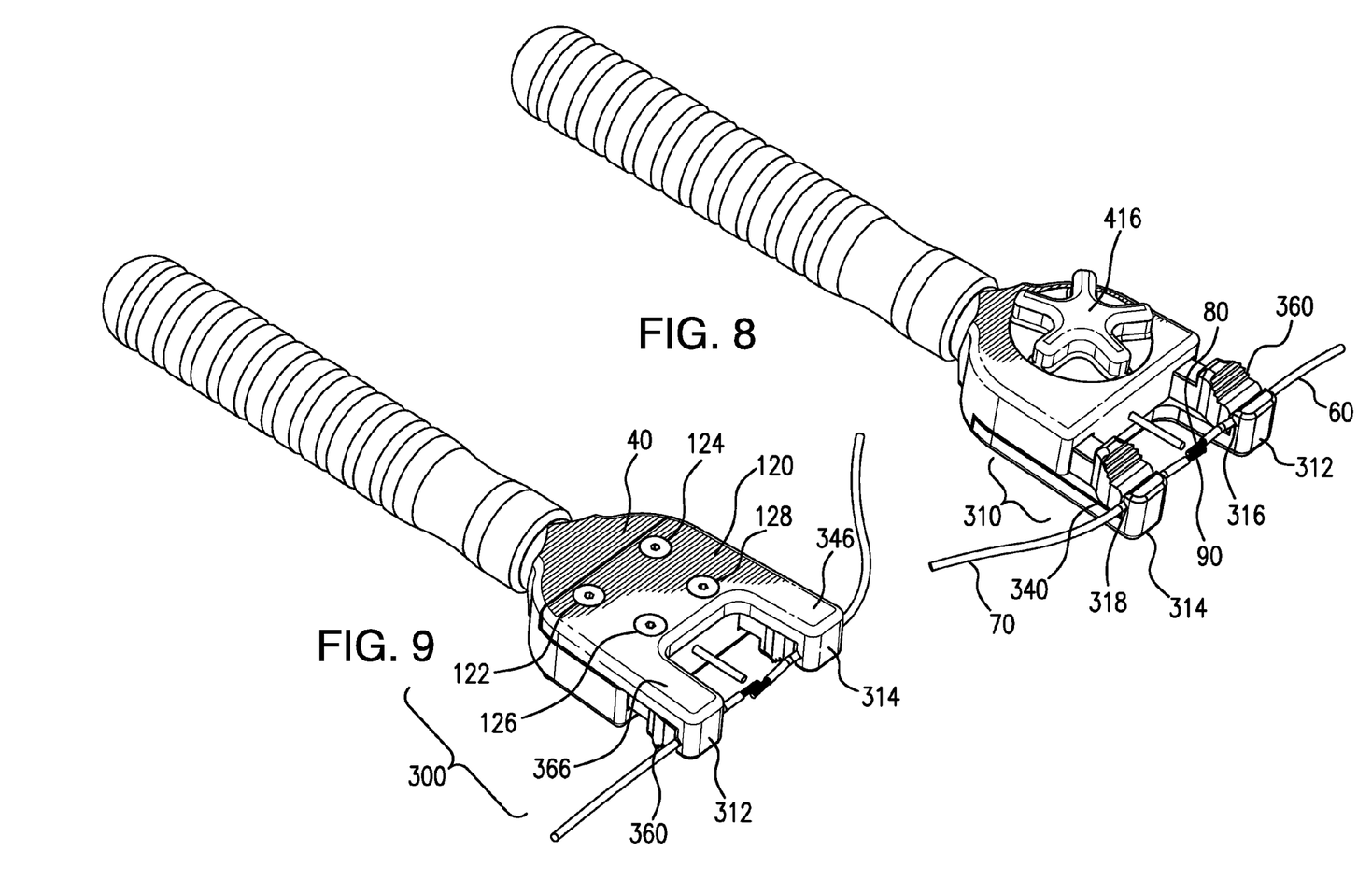
FIG. 8 is a perspective view of a second preferred embodiment.
FIG. 9 is a bottom plan view of the preferred embodiment illustrated in FIG. 8.
Figure 10:
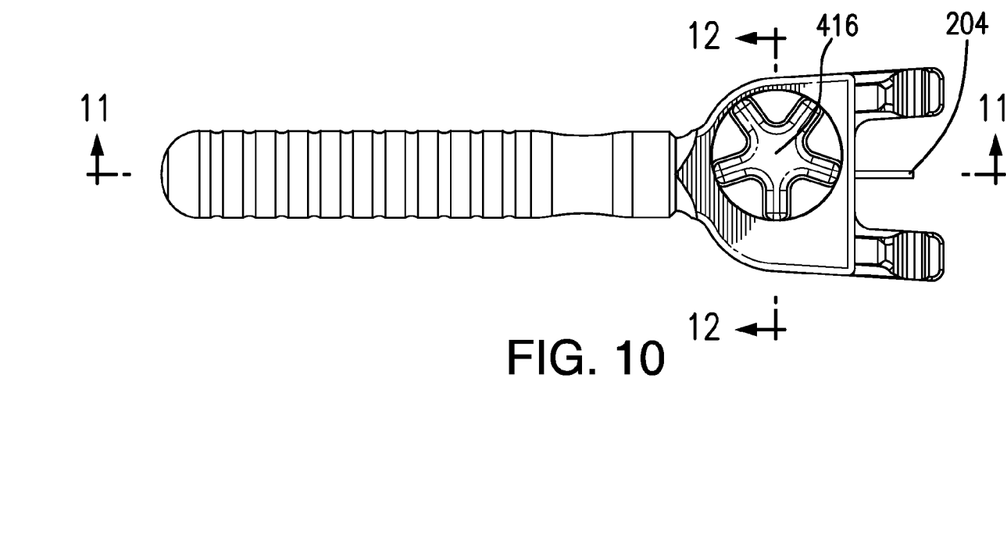
FIG. 10 is a top plan view of the preferred embodiment illustrated in FIG. 8.

Movable jaws 140, 160 are provided with retaining surfaces 142, 162 configured to secure wires 60, 70 to be soldered. Ridged thumb pads 152, 172 shaped to overlay tool body extensions 146, 166 are provided on the jaw mount base 40. Slidable mounting assemblies 156 (not shown), 176 (shown in FIG. 5) provide lateral, secured moveability of the jaws 140, 160 on the jaw piece 120. Tool body extension cavities 148 (not shown), 168 (shown in FIG. 5) provided in the tool body extension 146, 166 are shaped to receive springs 150, 170 disposed therein. The position of spring 170 is shown in FIG. 5. Spring compressor members 154, 174 are further received in the tool body extension cavities 148, 168 and positioned to secure springs 150, 170 therein. Thus, the springs 150, 170 are interposed between the spring compressor members 154, 174 and the deepest recesses of the tool body extension cavities 148, 168 so as to be held in depressed and contained relation. The springs 150, 170 push the retaining surfaces 142, 162 of the movable jaws 140, 160 against the grooves 116, 118 in the stationary jaws 112, 114, thereby holding wires 60, 70 in place during soldering.

A first embodiment of a solder supply assembly 200 is disclosed. FIG. 2, a cut away view of FIG. 1, and FIG. 3, a cross-section, illustrate that the handle 20 is hollow and detachable from the tool body 30, and is provided with a solder supply cavity 206 configured to receive a supply coil 202 of solder 204 to be dispensed during soldering.

Figure 3:
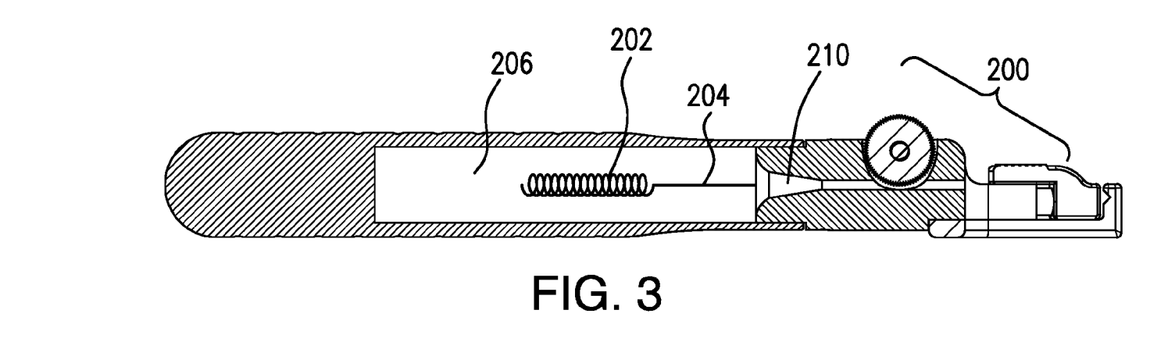
FIG. 3 is a cross-sectional view of the preferred embodiment illustrated in FIG. 4 taken along the line 3-3.
Figure 4:
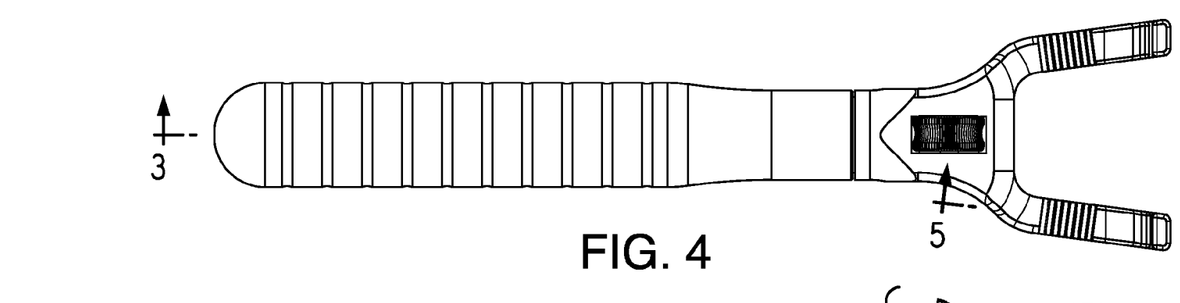
FIG. 4 is a top plan view of the preferred embodiment illustrated in FIG. 1.

FIGS. 2 and 3 show cut away and cross section views, respectively, depicting the path through which the solder 204 can be fed from the supply coil 202 through the tool body 30. A solder channel 208 through the center of the tool body 30 approximately parallel to and equidistant between the clamp assemblies 100 is provided. The solder channel 208 is sized to accept a standard diameter of solder 204. The solder channel 208 further has a tapered solder inlet terminus 210 tapered to guide the solder 204 into the solder channel 208. Solder 204 can be fed from the supply coil 202 positioned in the solder supply cavity 206. The solder channel 208 terminates at a solder outlet aperture 212 positioned approximately equidistant from the jaw pairs.

Machined into tool body 30 is a thumbwheel cavity 214 configured to receive a thumbwheel 216. Thumbwheel 216 is mounted on an axle 218 secured within thumbwheel cavity 214. The thumbwheel 216 is provided with an outer frictional solder engagement surface 220 positioned to contact the solder 204 located in the channel 208, such that rotation of the thumbwheel 216 around the axle 218 will advance solder 204 toward and through the aperture 212.

Returning to the second embodiment of the clamp assembly 100 in more detail, shown in FIGS. 8-15, two jaw pairs are provided, although again it can be seen that a single jaw pair of similar construction would suffice to maintain two wires in position to be soldered. Two movable jaws 340, 360 are constructed and arranged to cooperate with respective stationary jaws 312, 314 to hold wires 60, 70 in place for soldering. Each movable jaw 340, 360 is movable from a first, releasing position away from its corresponding stationary jaw 312, 314 and a second, contact position adjacent to or proximal to its corresponding stationary jaw 312, 314. The movable jaws 340, 360 are biased toward the contact position by a biasing assembly, as follows.

Movable jaws 340, 360 are provided with retaining surfaces 342, 362 configured to secure wires 60, 70 to be soldered. Ridged thumb pads 352, 372 shaped to overlay slidable mounting assemblies 356, 376. Tool body extensions 346, 366 are provided on the jaw mount base 40. Slidable mounting assemblies 356, 376 provide lateral, secured moveability of the jaws 340, 360 on the jaw piece 120. Tool body extension cavities 348, 368 provided in the tool body extension 346, 366 are shaped to receive springs 350, 370 disposed therein. Spring compressor members 354, 374 are further received in the tool body extension cavities 348, 368 and positioned to secure springs 350, 370 therein. Thus, the springs 350, 370 are interposed between the spring compressor members 354, 374 and the deepest recesses of the tool body extension cavities 348, 368 so as to be held in depressed and contained relation. The springs 350, 370 push the retaining surfaces 342, 362 of the movable jaws 340, 360 against the grooves 316, 318 in the stationary jaws 312, 314, thereby holding wires 60, 70 in place during soldering.

A second embodiment of a solder supply assembly 200 is also disclosed and shown in FIGS. 8-15. As with the first embodiment, the handle 20 is hollow and detachable from the tool body 30, and is provided with a solder supply cavity 206 configured to receive a supply coil 202 of solder 204 to be dispensed during soldering. A solder channel 408 through the center of tool body 30 approximately parallel to and equidistant between the clamp assemblies 100 is provided. The solder channel 408 is sized to accept a standard diameter of solder 204. The solder channel 408 further has a tapered solder inlet terminus 410 tapered to guide the solder 204 into the solder channel 408. Solder 204 can be fed from the supply coil 202 positioned in the solder supply cavity 206. The solder channel 408 terminates at a solder outlet aperture 412 positioned approximately equidistant from the jaw pairs.

Figure 15:
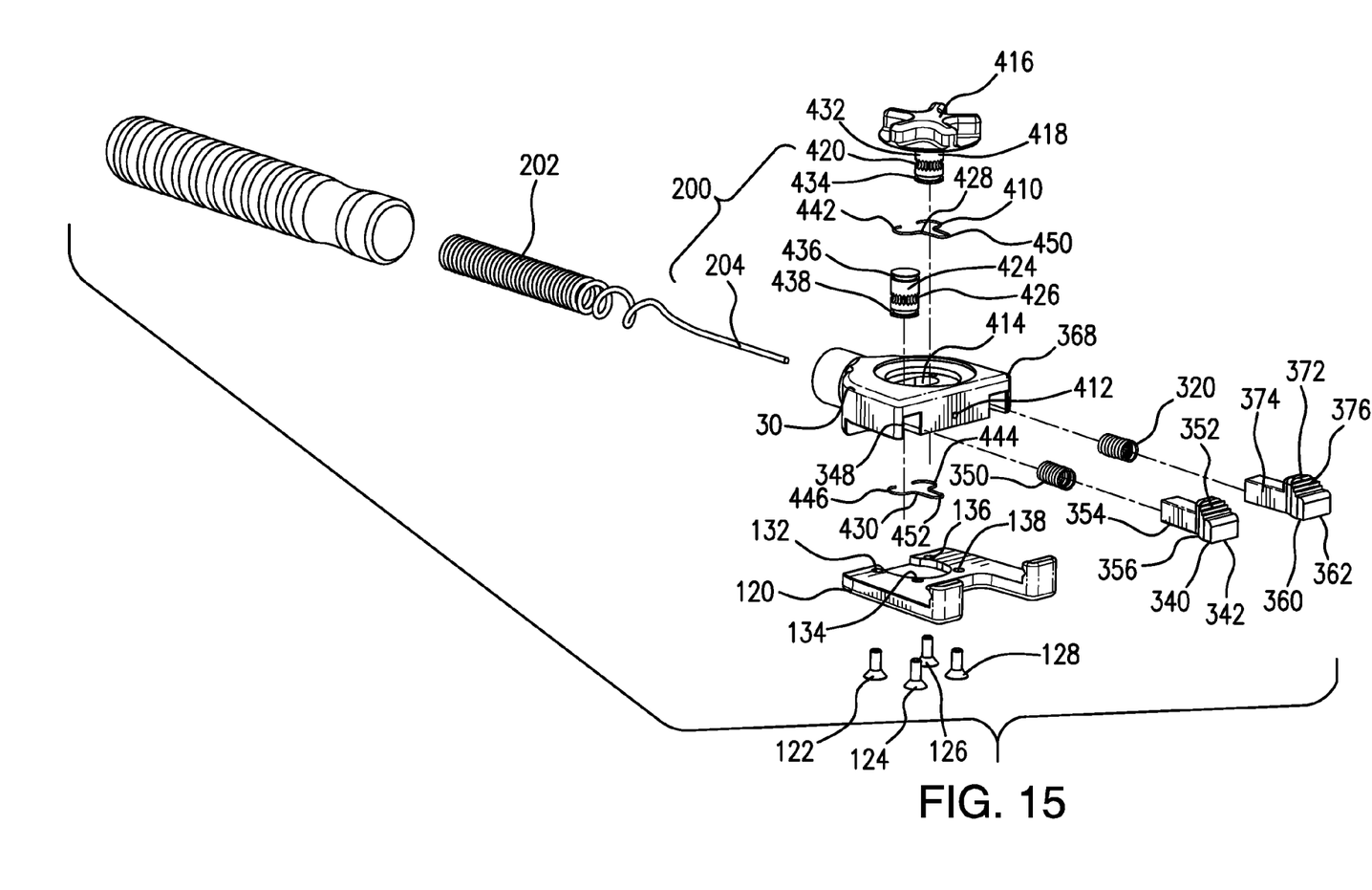
FIG. 15 is an exploded view of the preferred embodiment illustrated in FIG. 10.

A second embodiment of a solder supply assembly is shown in exploded view in FIG. 15. This embodiment has a horizontal thumbwheel 416. Thumbwheel 416 is fixedly mounted on stud 418. Machined into tool body 30 is an oblong thumbwheel cavity 414 configured to receive stud 418 and a solder roller 424, such that they are next to each other with their axes substantially parallel and vertical, with their mating surfaces in the center of tool body 30. The stud 418 is provided with an outer frictional solder engagement surface 420 and solder roller 424 has an analogous and matching solder engagement surface 426. These solder engagement surfaces 420 and 426 are positioned to contact the solder 204 located in the channel 408, such that rotation of the thumbwheel 416 and thus stud 418 will frictionally advance solder 204 between stud 418 and solder roller 424 toward and through the aperture 412.

Shown in further detail and exploded view in FIG. 15 are upper spring 428 and lower spring 430. Also it can be see that machined around the upper edge of stud 418 is an upper stud notch 432 and around the bottom edge is a lower stud notch 434. In an analogous fashion solder roller 424 has machined into it an upper roller notch 436 and a lower roller notch 438.

Upper spring 428 is configured so as to have two arms 440 and 442 that clip tightly onto upper stud notch 432 and upper roller notch 436, respectively. The upper spring, 428 is biased closed so that the two arms 440 and 442 thus hold stud 418 and solder roller 424 tightly together. This closed bias serves also to increase the intimate contact of solder engagement surfaces 426 and 420 with solder 204 and therefore the effectiveness of the thumbwheel 416 in advancing solder 204 forward and through aperture 412.

Looking now at the lower spring 430 in FIG. 15, it can be seen that in an analogous fashion to upper spring 428, lower spring 430 also has two arms 444 and 446. These arms 444 and 446 are configured to clip tightly into lower stud notch 434 and lower roller notch 438. Lower spring 430 also is biased closed so that stud 418 and solder roller 424 are held tightly against each other and therefore also the intimate contact of solder engagement surfaces 424 and 420 with solder 204 is increased.

Additionally as can be seen in FIG. 15 the upper spring 428 is provided with a tongue, 450 that is positioned between and extending out in the same plane from arms 440 and 442. This tongue, 450 extends beyond the top opening of oblong roller cavity 414. The lower spring 430 is configured in an analogous fashion to upper spring 428, thus having a tongue 452 that is positioned between and extending in the same plane from arms 444 and 446 and also extending beyond the bottom opening of oblong thumbwheel cavity 414. This tongue 452, like tongue 450 is configured to extend beyond the edge of oblong thumbwheel cavity 414.

Continuing to examine FIG. 15, it can be seen that to assemble the second embodiment of the solder supply assembly 200, upper spring 428 is clipped onto stud 418 and solder roller 424. Stud 418 and solder roller 424 are then put into position in oblong thumbwheel cavity 414. The tongue 450 then presses on top of tool body 30. The lower spring 430 is then clipped onto the lower stud notch 432 and lower roller notch 438. The tongue 452 on lower spring 430 thus presses against the underside of tool body 30. It can be appreciated that springs 428 and 430 not only improve the intimate contact of solder engagement surfaces 424 and 420 with solder 204 and thus the effectiveness of thumbwheel 416, but also serve to lock stud 418 and solder roller 424 in position in tool body 30.

Figure 11:
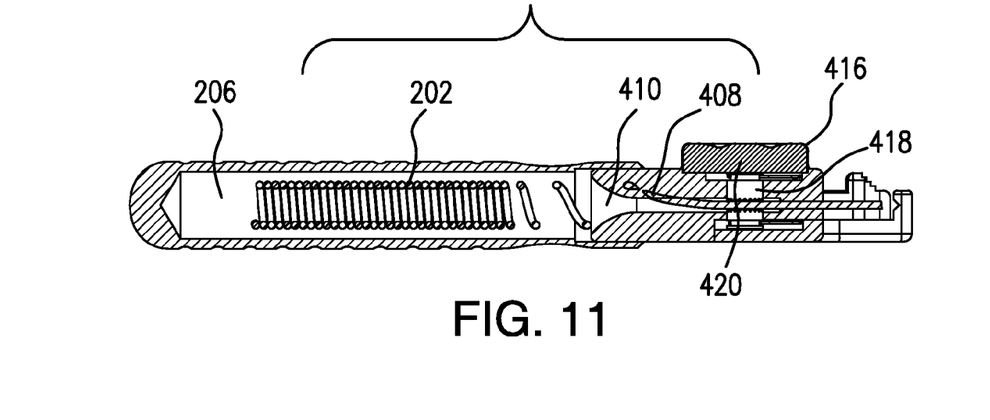
FIG. 11 is a cross-sectional view of the preferred embodiment illustrated in FIG. 10 taken along the line 11-11.
Figure 12:
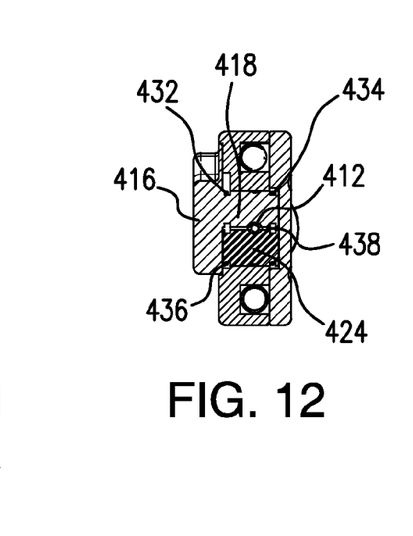
FIG. 12 is a cross-sectional view of the preferred embodiment illustrated in FIG. 10 taken along the line 12-12.
Figure 13:
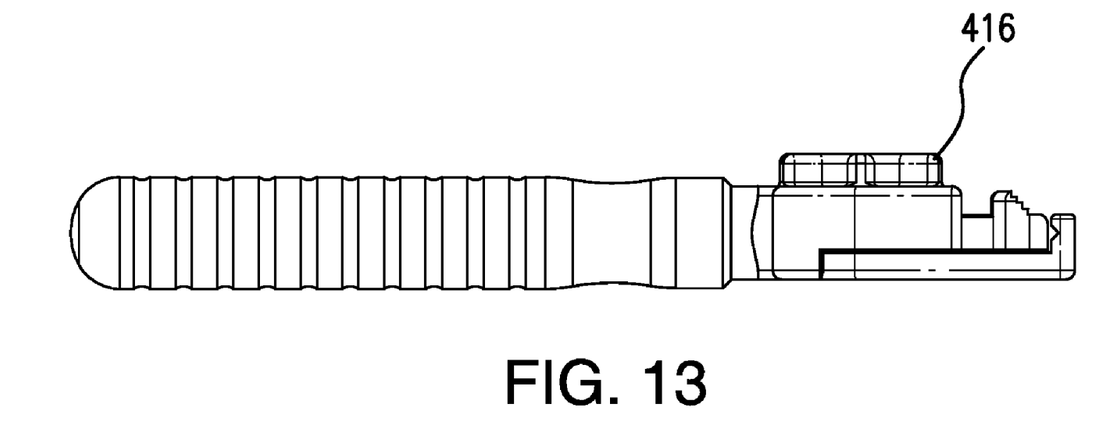
FIG. 13 is a cut-away side view of the preferred embodiment illustrated in FIG. 10.
Figure 14:
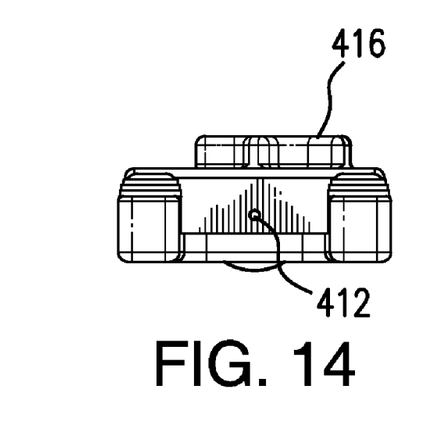
FIG. 14 is a front view of the preferred embodiment illustrated in FIG. 10.

In this second embodiment, the solder supply assembly 200 provides an off-center thumbwheel 416 instead of the vertical thumbwheel 216 of the first embodiment. FIGS. 11 and 12 show in cross section the positions of off-center thumbwheel 416, stud 418 and solder roller 424. Stud 418 fits into thumbwheel cavity 414, machined to be on one side of and in communication with and solder roller 424. Solder channel 408 thus feeds into solder engagement surfaces 424 and 420 which then feed into aperture 412.

With either embodiment or with any combination thereof, use of the tool 10 is straightforward. A supply of solder 204 is disposed within the handle 20. One end of the solder 204 is positioned through a channel 208 in the tool body 30. Solder 204 is advanced outwardly towards wire ends 80, 90 by rotation of the thumb wheel 216. In operation, jaw 140 is pulled rearwardly against the biasing force of spring 150 and the end 80 of wire 60 is placed in the groove 116 in jaw 112. Jaw 140 is then allowed to return to its forward position, thus securing wire 60 in position. The same procedure is followed on the other side; jaw 160 is pulled rearwardly against the biasing force of spring 170 and the end 90 of wire 70 is placed in groove 118 in jaw 114. Jaw 160 is then allowed to return to its forward position, thus securing wire 70 in position.

Thus, a wire alignment tool for use during soldering is disclosed. The tool has a handle, a solder advancement mechanism and a clamping mechanism. The handle has a solder supply cavity configured to contain a supply of solder and a solder channel in supply communication with the solder supply cavity and a solder outlet aperture disposed proximal to a soldering locus. The solder advancement mechanism is constructed and arranged to move the supply of solder from the solder supply cavity through the solder outlet aperture. The solder advancement mechanism has a thumbwheel mounted to the tool and oriented to present an outer engagement surface in frictional communication with the solder supply. The thumbwheel is further oriented to be engageable by the hand of a user, whereby rotation of the thumbwheel in a forward direction moves solder from the supply cavity through the solder outlet aperture and to the soldering locus. The clamping mechanism is constructed and arranged to maintain two or more wires to be soldered at the soldering locus. The clamping mechanism has a pair of jaw assemblies each having a stationary jaw and a movable jaw. Each of the movable jaws is movable from an engaged position, in contact with the corresponding stationary jaw, and a releasing position, away from the corresponding stationary jaw. Each movable jaw is biased in the engaged position.

The described embodiments are to be considered in all respects only as illustrative and not restrictive, and the scope of the invention is, therefore, indicated by the appended claims rather than by the foregoing description. Those of skill in the art will recognize changes, substitutions and other modifications that will nonetheless come within the scope of the invention and range of the claims.

What is claimed is:

1. A wire alignment tool for use during soldering comprising:
   a handle configured to contain a supply of solder;
   a solder advancement mechanism constructed and arranged to move the supply of solder from the handle to a soldering locus; and
   a clamping mechanism constructed and arranged to maintain two or more wires to be soldered at the soldering locus.

2. The wire alignment tool of claim 1, the handle further comprising a solder supply cavity configured to contain a supply of solder and a solder channel in supply communication with the solder supply cavity and a solder outlet aperture disposed proximal to the soldering locus.

3. The wire alignment tool of claim 1, the solder advancement mechanism further constructed and arranged to move the supply of solder from the solder supply cavity through the solder outlet aperture, the solder advancement mechanism having a thumbwheel mounted to the tool and oriented to present an outer engagement surface in frictional communication with the solder supply and further being oriented to be engageable by the hand of a user thereof, whereby rotation of the thumbwheel in a forward direction moves solder from the supply cavity through the solder outlet aperture and to the soldering locus.

4. The wire alignment tool of claim 1, the clamping mechanism further comprising a pair of jaw assemblies each having a stationary jaw and a movable jaw, each movable jaw being movable from an engaged position, in contact with the corresponding stationary jaw, and a releasing position, away from the corresponding stationary jaw, each movable jaw further being biased in the engaged position.

5. The wire alignment tool of claim 2, the solder advancement mechanism further constructed and arranged to move the supply of solder from the solder supply cavity through the solder outlet aperture, the solder advancement mechanism having a thumbwheel mounted to the tool and oriented to present an outer engagement surface in frictional communication with the solder supply and further being oriented to be engageable by the hand of a user thereof, whereby rotation of the thumbwheel in a forward direction moves solder from the supply cavity through the solder outlet aperture and to the soldering locus.

6. The wire alignment tool of claim 1, the clamping mechanism further comprising a pair of jaw assemblies each having a stationary jaw and a movable jaw, each movable jaw being movable from an engaged position, in contact with the corresponding stationary jaw, and a releasing position, away from the corresponding stationary jaw, each movable jaw further being biased in the engaged position.

7. The wire alignment tool of claim 3, the clamping mechanism further comprising a pair of jaw assemblies each having a stationary jaw and a movable jaw, each movable jaw being movable from an engaged position, in contact with the corresponding stationary jaw, and a releasing position, away from the corresponding stationary jaw, each movable jaw further being biased in the engaged position.

8. A wire alignment tool for use during soldering comprising:
- a handle having a solder supply cavity configured to contain a supply of solder and a solder channel in supply communication with the solder supply cavity and a solder outlet aperture disposed proximal to a soldering locus;
- a solder advancement mechanism constructed and arranged to move the supply of solder from the solder supply cavity through the solder outlet aperture, the solder advancement mechanism having a thumbwheel mounted to the tool and oriented to present an outer engagement surface in frictional communication with the solder supply and further being oriented to be engageable by a hand of a user thereof, whereby rotation of the thumbwheel in a forward direction moves solder from the supply cavity through the solder outlet aperture and to the soldering locus;
- a clamping mechanism constructed and arranged to maintain two or more wires to be soldered at the soldering locus, the clamping mechanism comprising a pair of jaw assemblies each having a stationary jaw and a movable jaw;
- each movable jaw being movable from an engaged position, in contact with the corresponding stationary jaw, and a releasing position, away from the corresponding stationary jaw, each movable jaw further being biased in the engaged position.

* * * * *